United States Patent [19]

Templeman et al.

[11] Patent Number: 5,498,912
[45] Date of Patent: Mar. 12, 1996

[54] MAJORITY VOTED TWO FAULT TOLERANT POWER SWITCH

[75] Inventors: Douglas D. Templeman, Riverside; Melvyn Weiss, Thousand Oaks, both of Calif.

[73] Assignee: Rockwell International Corporation, Seal Beach, Calif.

[21] Appl. No.: 131,184

[22] Filed: Oct. 4, 1993

[51] Int. Cl.⁶ .................................................. G06F 11/08
[52] U.S. Cl. ................................ 307/115; 326/11; 371/26
[58] Field of Search ................................ 326/11, 13, 59, 326/9, 10, 12, 35; 371/36; 307/18, 23, 43, 113, 116, 112, 125, 115

[56] References Cited

U.S. PATENT DOCUMENTS

| | | | |
|---|---|---|---|
| 4,644,498 | 2/1987 | Bedard et al. | 364/900 |
| 4,697,093 | 9/1987 | Sutherland et al. | 307/38 |
| 4,799,140 | 1/1989 | Dietz et al. | 371/36 |
| 4,857,762 | 8/1989 | Gaebel | 326/10 |
| 4,868,826 | 9/1989 | Smith et al. | 371/36 |
| 5,280,202 | 1/1994 | Chan et al. | 307/465 |
| 5,386,424 | 1/1995 | Driscoll et al. | 371/36 |

*Primary Examiner*—William M. Shoop, Jr.
*Assistant Examiner*—Jonathan Kaplan
*Attorney, Agent, or Firm*—Lawrence N. Ginsberg; Charles T. Silberberg

[57] ABSTRACT

A majority voted two-fault tolerant power switch for delivering power from a system to an intended load. The power switch comprises a voter, two fault tolerant power switching apparatus, and testing apparatus. The voter comprises a command interface for receiving voter input commands from the system and, two fault tolerant voting logic for selecting a voter output as determined from a majority of the voter input commands. The two fault tolerant power switching apparatus receives power input from the system. The power switching means is controlled by the voter output. An output from the power switching apparatus is connected to the intended load. The testing apparatus receives test signals from the system. It provides test status outputs to the system of the voter and the power switching apparatus.

7 Claims, 5 Drawing Sheets

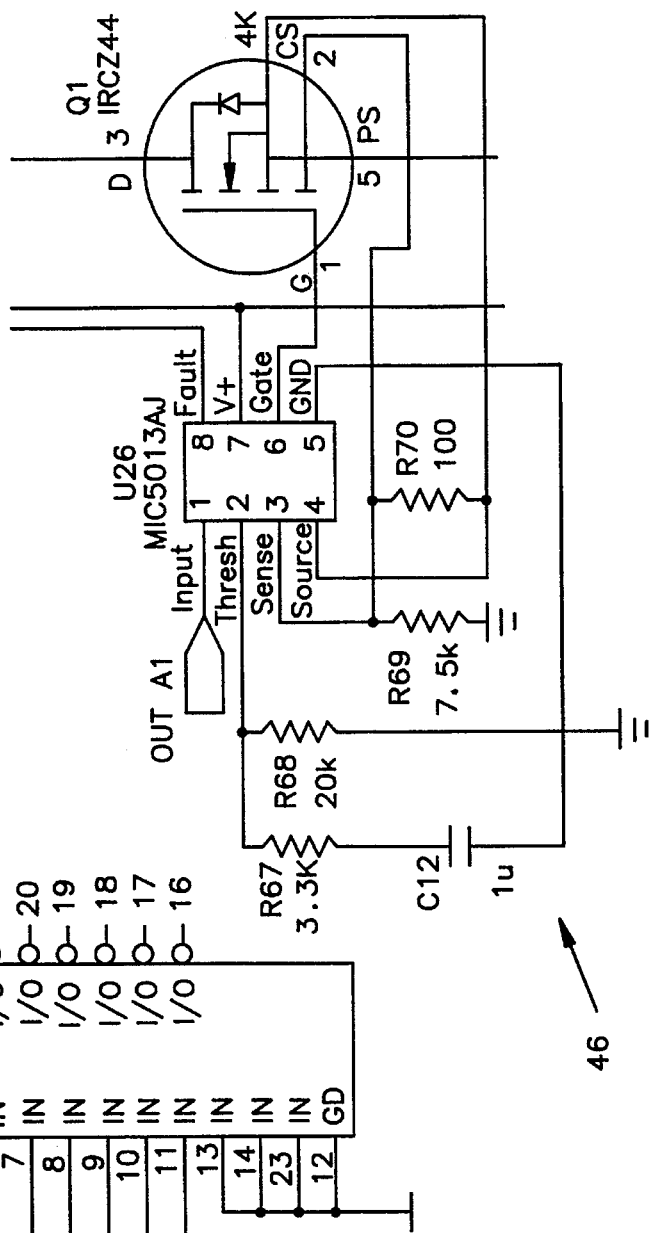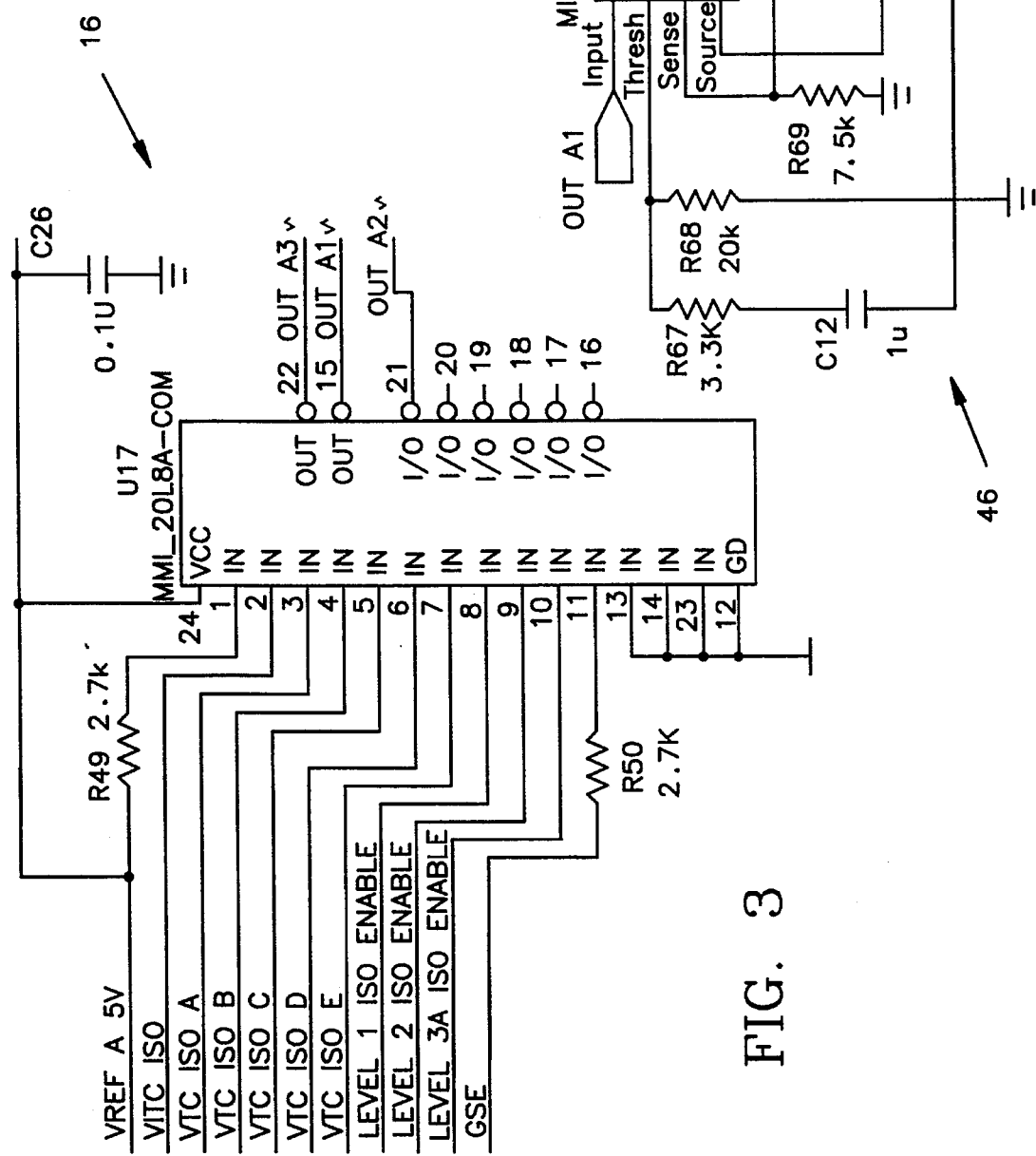
FIG. 4
FIG. 3

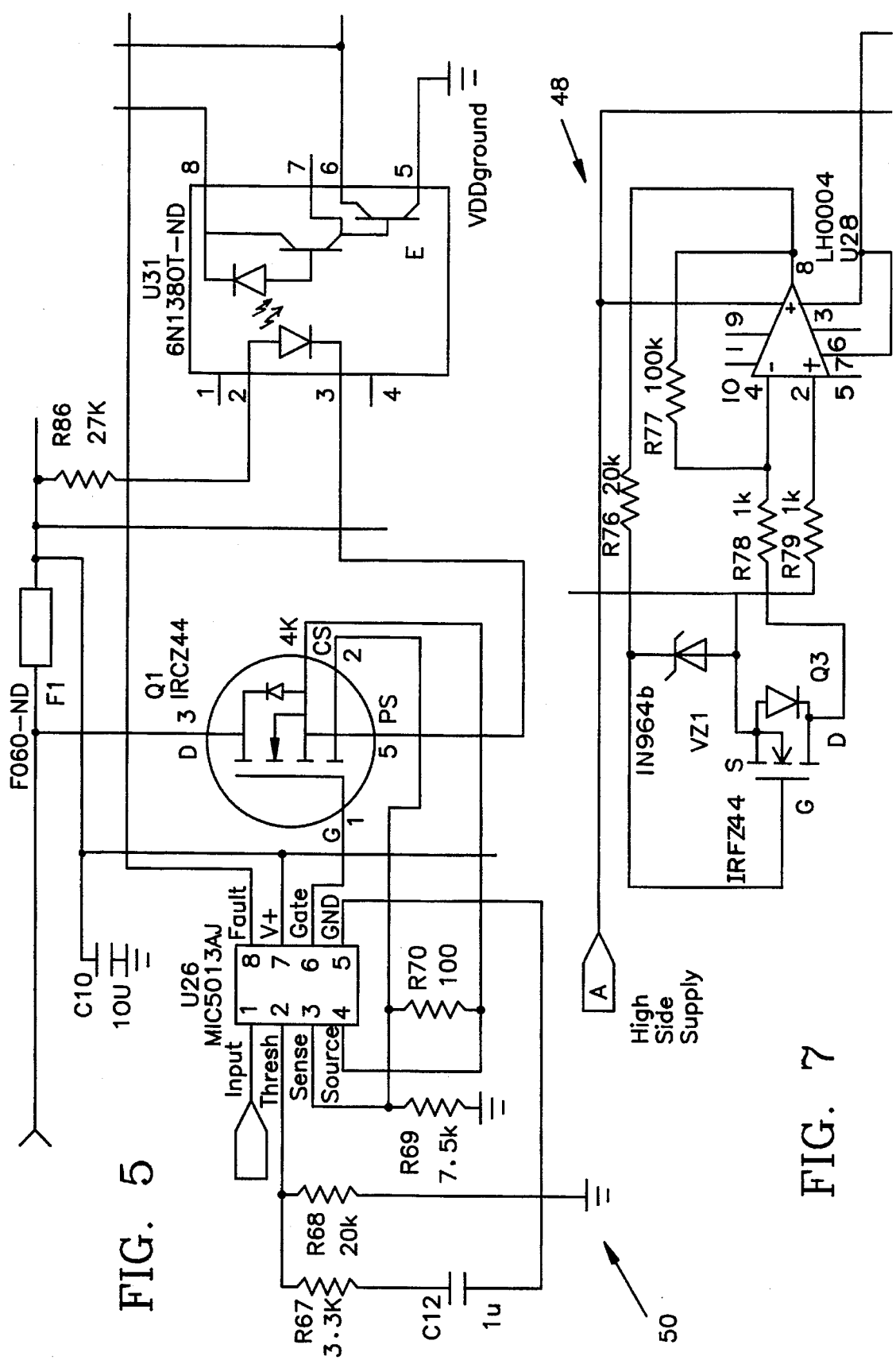

5,498,912

MAJORITY VOTED TWO FAULT TOLERANT POWER SWITCH

BACKGROUND OF THE INVENTION

1. Field of the Invention

The present invention relates to power switches and more particularly to a majority voted two fault tolerant power switch.

2. Description of the Related Art

Presently available fault tolerant or redundant effector designs which utilize moderate power consumption generally need a complex power switching scheme. Generally, such conventional systems require cross-strapping and/or multiple lines to maintain the fault tolerance of the system. Fault tolerance of typical power switching is often difficult to accomplish and requires a large number of conventional components to implement properly.

OBJECTS AND SUMMARY OF THE INVENTION

It is, therefore, a principal object of the present invention to provide majority voting for power switching which maintains two-fault tolerance.

Another object of the present invention is to provide internal self test.

Still another object of the present invention is to provide low power consumption.

Yet another object of the present invention is to provide a simple isolated interface between the vote and the self test features.

Still another object of the present invention is the use of wire fuses to prevent damage to external devices.

Still another object is to provide a power switch which may be easily modified for relatively high or relatively low currents.

Still another object of the present invention is to monitor the over current status of the intended load.

Still another object is to provide a simple isolated interface between the system and voter and system and test.

These and other objects are achieved by the present invention which is a majority voted two-fault tolerant power switch for delivering power from a system to an intended load. In its broad aspects, the power switch comprises a voter, two fault tolerant power switching means, and testing means. The voter comprises a command interface for receiving voter input commands from the system and, two fault tolerant voting logic means for selecting a voter output as determined from a majority of the voter input commands. The two fault tolerant power switching means receives power input from the system. The power switching means is controlled by the voter output. An output from the power switching means is connected to the intended load. The testing means receives test signals from the system. It provides test status outputs to the system of the voter and the power switching means.

The power switching means preferably comprises a plurality of MOSFETS arranged in a series-parallel configuration for receiving the voter output and the power input from the system, and, active diode circuitry for receiving switch inputs from the MOSFETS and for providing the output from the power switching means to the intended load.

The active diode circuitry preferably comprises a plurality of active diodes arranged in a series-parallel configuration. Each active diode comprises a MOSFET and an operational amplifier, the operational amplifier sensing the MOSFET's output and generating a feedback signal therefrom.

BRIEF DESCRIPTION OF THE DRAWINGS

FIG. 3 is a schematic illustration of the majority voting logic of FIG. 1.

FIG. 4 illustrates the drive circuitry for power switching.

FIG 5 illustrates the circuitry for the switch status.

FIG. 7 is a schematic illustration of an active diode of the present invention.

The same parts throughout the figures of the drawings are illustrated by the same reference characters.

DETAILED DESCRIPTION OF THE PREFERRED EMBODIMENTS

Figure 1:
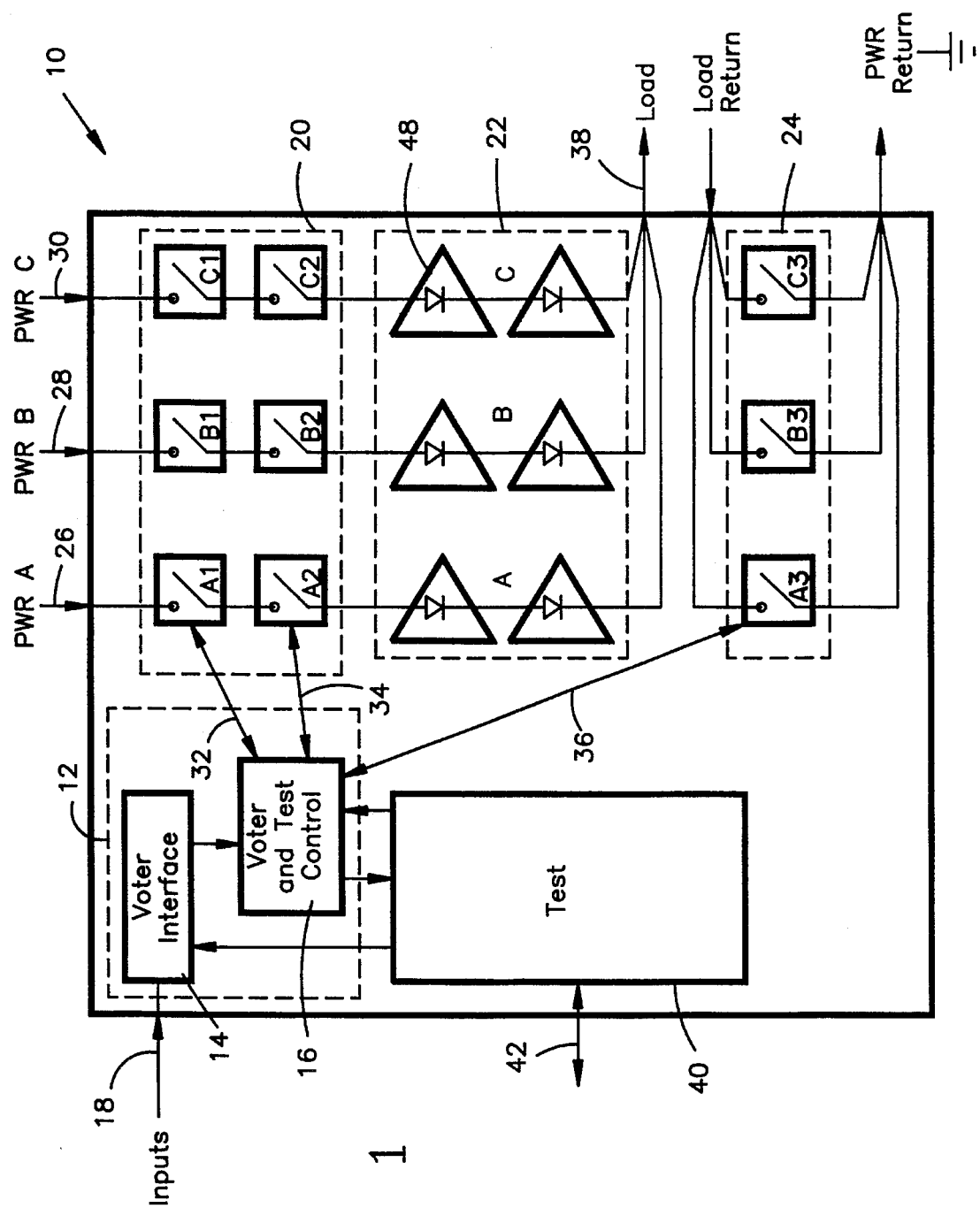
FIG. 1 is a block diagram of the power switch of the present invention.

Referring now to the drawings and the characters of reference marked thereon, FIG. 1 illustrates the majority voted two-fault tolerant power switch of the present invention, designated generally as 10. Power switch 1 includes a voter designated within phantom lines 12. Voter 12 includes a command interface 14 and a two-fault tolerant voting logic means (i.e. voter and test control) 16. The command interface 14 receives voter input commands 18 from the system. The voter control 16 selects a voter output as determined from a majority of the voter input commands. Two fault tolerant power switching means 20, 22, 24 receive power input 26, 28, 30 and is controlled by the voter output 32, 34, 36. The power switching means 20, 22, 24 is connected to the intended load 38. The load is intended to be a floating load with power switching means 20, 22 (high side switching) and power switching means 24 (low side switching). Should a load not be floating, a modification of the power switching means can be accomplished. Testing means 40 receives test signals 42 from the system and provides test status outputs, also designated 42, to the system. It tests the voter 12 and power switching means 20, 22, 24.

The voter interface or command interface 14 preferably comprises an optically isolated command interface utilizing an LED and photo transistor. Inputs 18 comprise five input commands, voter input commands (VIC) A–E, each being referenced to a separate return. The commands must then be isolated in reference to a common return in order to perform the majority vote required to enable or disable the power switch. The isolation must be two-fault tolerant. Isolation is performed identically for each of the five inputs.

Figure 2:
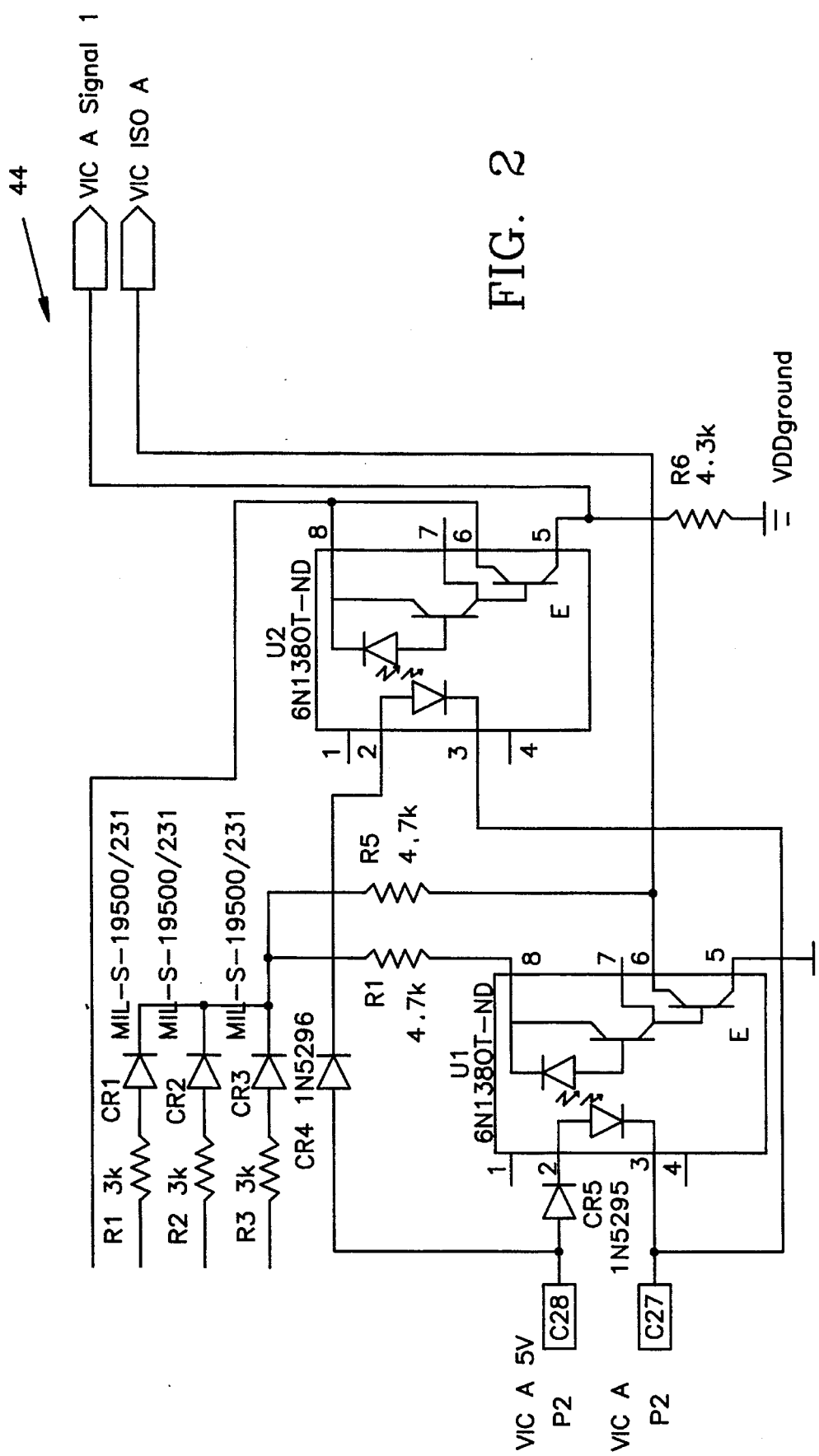
FIG. 2 is an electrical schematic of the optically isolated command interface portion of FIG. 1.

Referring now to FIG. 2 an example of the circuitry for VIC A is illustrated, designated generally as 44.

Operation of circuitry 44 is described as follows:

The command is given as a differential pair, labeled VIC A and VIC A 5 V. VIC A 5 V is a 5 volt reference. The voltage range for VIC A is 0–32 V. VIC A 5 V is fed into a constant current diode, CR5, and then into the anode of the LED in opto coupler U1. VIC A is input into the cathode of the LED in opto coupler U1. If VIC A is a "high" input, i.e.

within 1.5 V of VIC A 5 V, then the LED will be off, which in turn leaves the darlington transistor in U1 also off. This allows the collector to be pulled up to an isolated voltage. Three isolated voltages are required in order to make the command two fault tolerant. Two of the three voltage sources could fail and the command would still operate properly. If VIC A is low, i.e. more than 3 V below VIC A 5 V, the output transistor of U1 would be "on" which would pull down the transistor collector. The output is taken from the collector and labeled VIC ISO A.

The voltage sources used for pulling up the isolated command must be protected from a short circuit at the opto coupler and must also be ORed together. This is accomplished with the use of resistor/diode isolation. Each voltage source is ORed with a series combination of a 3 K ohm resistor—R1, R2 or R3 and a signal diode—CR1, CR2 or CR3. The isolated command is then pulled up through a 4.7 K ohm resistor.

An additional isolated command is required for test purposes. The testing circuitry is referenced to a separate return than that of the voting circuitry. In addition, the polarity of the signal must be reversed. A standard opto coupler interface is used, with a 4.3 K pull down resistor, R6, used at the emitter of the output transistor. In this case, the output is taken from the emitter, which inverts the original input signal. This output is labeled VIC A Signal 1. Power for this signal does not require fault tolerance because it is a test command.

Referring now to FIG. 3 the majority voting logic 16 is illustrated. Majority voting logic 16, to perform the three out of five majority vote and to aid in the test of the power voter, is contained in a Programmable Array Logic (PAL) device. FIG. 3 shows the use of this device in the power voter.

Each of the five isolated commands, VIC ISO A–E, is used as an input to the majority voting logic in the PAL. Each of the three majority vote outputs OUTA1~, OUTA2~ and OUTA3~ are controlled by the majority of the input commands, i.e. three or more "high" inputs will result in a high output and three or more "low" inputs will result in a low output.

The three outputs can also be controlled during test, when no input commands are present. This case uses inputs VITC ISO, Level 1 ISO Enable, Level 2 ISO Enable, Level 3A ISO Enable and GSE.

VITC ISO is a Voter Input Test Command which replaces all five of the VIC commands. The GSE input is an indicator which determines that the power voter is in a test mode when it is in a high state. The level enable commands determine which switches in each power string will be enabled.

During test, power must never actually be applied to a load. The level enabling commands are used to enable only a single level of the power voter, i.e. the first, second or third switch in each power voter string. Only a single level may be enabled at any one time. The PAL detects how many level enabling commands are on at any one time. If more than one is on, the VITC command will be ignored.

Power switching may be performed with the circuit, designated generally as 46, in FIG. 4. A high side switch driver IC, U26 Micrel MIC5013 is used to drive the gate of the Power MOSFET. The input to U26 is output 1 from the PAL. When this input is high, the driver IC supplies a voltage 12 V above the MOSFET source to the gate of the MOSFET, putting it into the constant resistance area region of operation. The driver IC contains a charge pump circuit that creates the voltage necessary to turn on the MOSFET. The FET being used, Q1 International Rectifier IRCZ44, is a current sensing MOSFET. A known fraction of the current flowing in the MOSFET is allowed to flow through the sense leads of the FET. This low value current is passed through current sensing resistor R70. The current sensing resistor is also connected across the sensing terminals of the MOSFET Driver IC. The IC contains over current shutdown circuitry that will shut off and latch off the gate drive output. When the voltage across R70 exceeds 100 mV, the circuitry is activated and the gate drive is latched off. Gate drive can only be reapplied after a change in input.

Protection against current feedback from one bus to another is prevented by the use of an "Active Diode" circuit, designated generally as 48 in FIG. 7 (and also shown in FIG. 1). This circuit 48 acts as a power switch, with a voltage drop of 100 mV, as long as current is flowing through the diode and into the load. If current were to attempt to flow in the opposite direction, which would occur when a voltage mismatch occurs between the three power buses, the Active Diode 48 would behave as a diode, blocking the negative current flow. Operation of this active diode circuit is as follows:

Op Amp U28 detects the voltage drop across Q3. If the drop from the source to drain of Q3 is positive, then the output of U28 will be driven to the towards the positive rail until the drop is 100 mV. If the drop is less than 100 mV then the drive to Q3 will be reduced until the voltage drop is 100 mV. If a positive voltage drop of 100 mV cannot be achieved, due to a large difference in bus voltages, then the output of U28 would be driven to the negative rail. This would cause Q3 to turn off, and act like a diode which is reverse biased. Resistors R78 and R79 provide matching resistances to the inputs of the OpAmp. Resistor R77 provides negative feedback to the OpAmp for stability and to limit the gain of the amp. Diode VZ1 protects the MOSFET gate—source junction against an over voltage transient. Resistor R76 protects VZ1 from dissipating too much power during an over voltage condition.

The over current trip point is set by resistor R68 (see FIG. 5). The value for R68 is determined by the following formula: R68=2200/100 mV–1000. During turn on the trip point must be altered to allow for inrush current to the load. The trip point is altered by the series combination of R67 and C12. During turn on, as C12 is charging, the trip point is altered due to charging current flowing into C12, through R67. At turn on C12 acts like a short circuit, which increases the trip point to 0.58 V. As C12 charges the trip point decreases exponentially to 100 mV. This allows an inrush current of up to 5.8 times the nominal current to pass through the Power Voter.

Status of each of the MOSFET switches is monitored as part of the test circuitry 40. The status of each switch is monitored with the use of an opto coupler. FIG. 5 demonstrates this circuitry, designed generally as 50. (Circuitry 50 is part of test 40.) Coupler U31 is used to detect the switch status. The LED of U31, and series resistor R86, are placed in parallel with the MOSFET. When the MOSFET is on, the LED is shorted. This turns off the transistor of U31. The status output is taken from the collector of this transistor. When the MOSFET is off, current can pass through the LED, which turns on the transistor and pulls the status output to ground.

Figure 6:
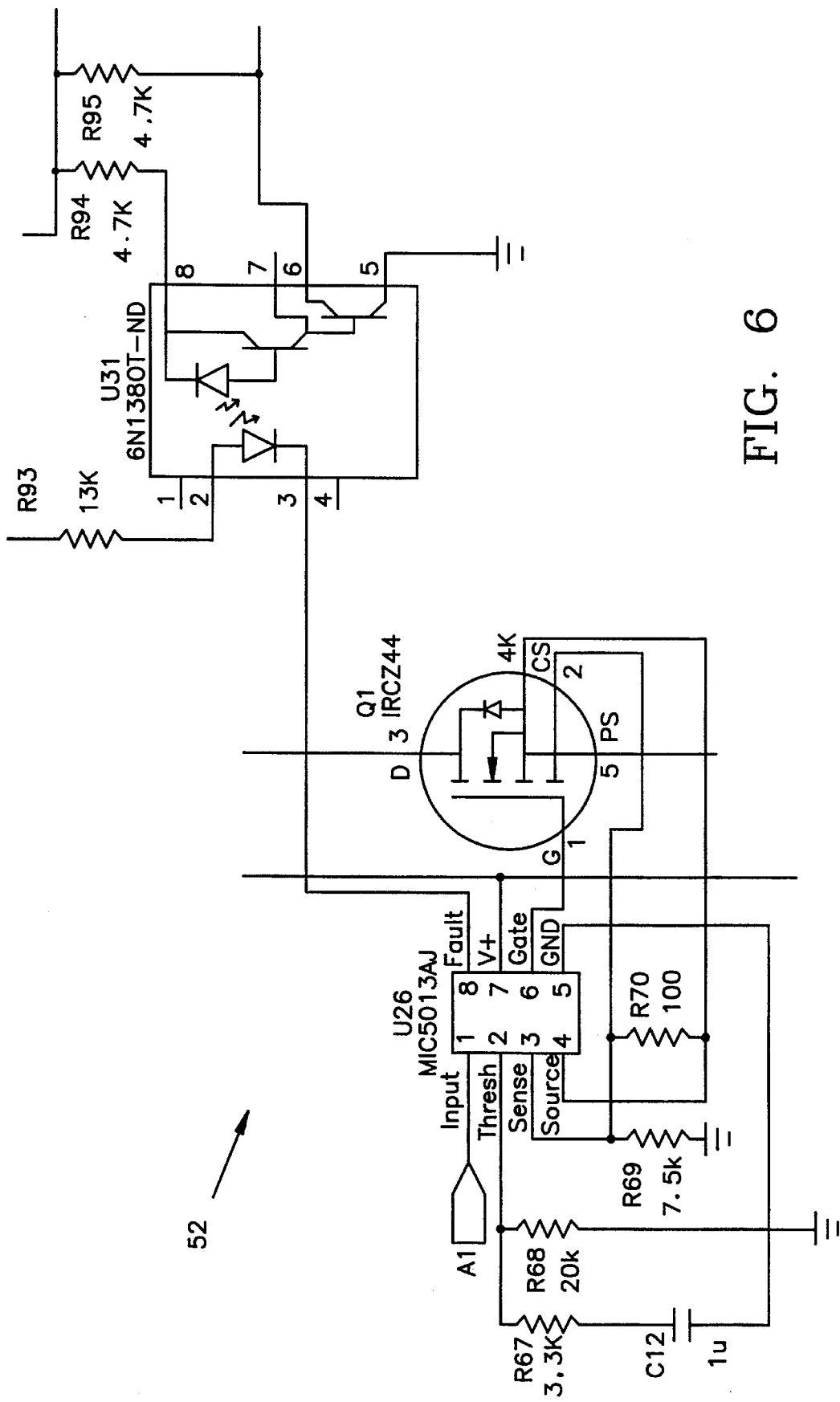
FIG. 6 shows the over current detection circuitry of the intended load.

Over current status is provided by the driver IC. FIG. 6 shows the detection circuitry, designated generally as 52.

U26 pin 8 is a fault indicator output. When an over current is detected this output goes to a high state, the VCC of the device. In this case it is the bus voltage. This output is level shifted and isolated with the use of opto coupler U34. Resistor R93 provides the current path through the LED. Resistor R95 provides a pull up to the TTL compatible supply. The status output is used for determining the state of health of the Power Voter.

Obviously, many modifications and variations of the present invention are possible in light of the above teachings. It is, therefore, to be understood that, within the scope of the appended claims, the invention may be practiced otherwise than as specifically described. For example, instead of using an optically isolated command interface, a non-optical interface may be used. Also, instead of five input commands, a different number of input commands (less than five) may be used depending on the system application. (If an even number of command inputs are used, modification of the power voter is required.) Furthermore, although the invention has been described with three power inputs, one or two power inputs may be used.

What is claimed and desired to be secured by Letters Patent of the United States is:

1. A majority voted two fault tolerant power switch for delivering power from a system to an intended load, comprising;
    a) a voter, comprising:
        i) a command interface for receiving voter input commands from said system, and,
        ii) two fault tolerant voting logic means for selecting a voter output as determined from a majority of said voter input commands;
    b) two fault tolerant power switching means for receiving power input from said system, said power switching means being controlled by said voter output, an output from said power switching means being connected to said intended load; and,
    c) testing means for receiving test signals from said system and providing test status outputs to said system of said voter and said power switching means, said testing means providing test status of specific conditions within said voter and two fault tolerant power switching means so as to monitor the status of said two fault tolerant power switch.

2. The power switch of claim 1 wherein power switching means, comprises:
    a) a plurality of MOSFETS arranged in a series-parallel configurations for receiving said voter output and said power input from said system; and,
    b) active diode circuitry for receiving switch inputs from said MOSFETS and for providing said output from said power switching means to said intended load.

3. The power switch of claim 2 wherein said active diode circuitry comprises:
    a plurality of active diodes arranged in a series-parallel configuration, each active diode, comprising:
    a MOSFET and a driver integrated circuit, said driver integrated circuit sensing said MOSFET's output and generating a feedback signal therefrom.

4. The power switch of claim 1 wherein said command interface comprises an optically isolated command interface.

5. The power switch of claim 1 wherein said command interface comprises less than or equal to five input commands.

6. The power switch of claim 1, wherein said two-fault tolerant power switching means receives less than or equal to three power inputs.

7. The power switch of claim 1, wherein said two-fault tolerant voting logic means comprises a plurality of PAL devices.

* * * * *